(No Model.)
S. M. MACOMBER.
HAND CORN PLANTER.
No. 266,487. Patented Oct. 24, 1882.
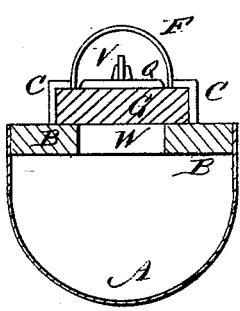
Fig. 5
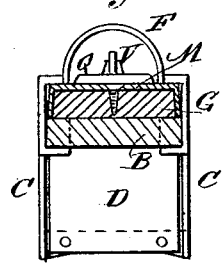
Fig. 4
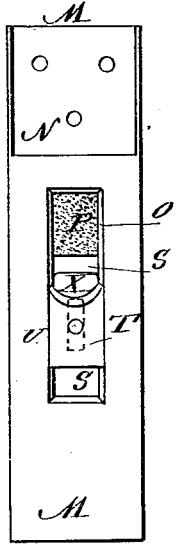
Fig. 3
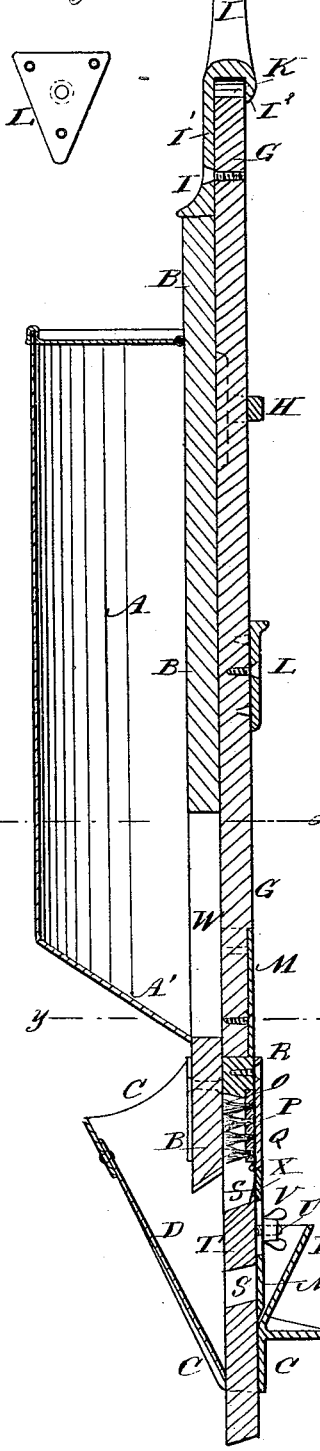
Fig. 1  Fig. 6
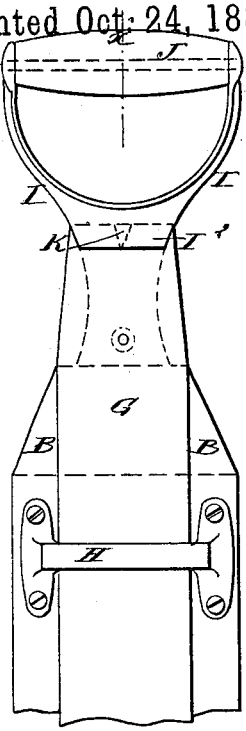
Fig. 2
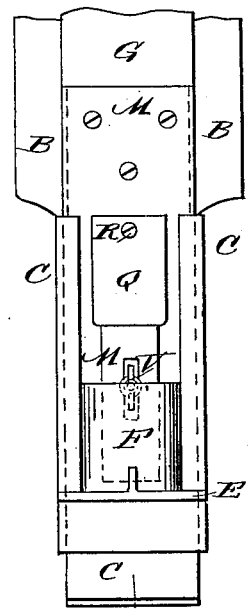
WITNESSES:
C. Neveux
C. Sedgwick
INVENTOR:
S. M. Macomber
BY Munn & Co
ATTORNEYS.

UNITED STATES PATENT OFFICE.

SAMUEL M. MACOMBER, OF GRAND ISLE, VERMONT.

HAND CORN-PLANTER.

SPECIFICATION forming part of Letters Patent No. 266,487, dated October 24, 1882.

Application filed June 24, 1882. (No model.)

*To all whom it may concern:*

Be it known that I, SAMUEL M. MACOMBER, of Grand Isle, in the county of Grand Isle and State of Vermont, have invented a new and useful Improvement in Hand Corn-Planters, of which the following is a full, clear, and exact description.

Reference is to be had to the accompanying drawings, forming a part of this specification, in which similar letters of reference indicate corresponding parts in all the figures.

Figure 1 is a sectional rear elevation of my improvement, taken through the line $xx$, Fig. 2. Fig. 2 is a side elevation of the same. Fig. 3 is an elevation of the inner side of the plate carrying the seed-gage and the cut-off brush. Fig. 4 is a sectional plan view of the improvement, taken through the line $yy$, Fig. 1. Fig. 5 is a sectional plan view of the same, taken through the line $zz$, Fig. 1. Fig. 6 is a plan view of a stop-plate for the slide-bar.

The object of this invention is to promote convenience in the construction, adjustment, and use of hand corn-planters.

A represents the seed-box, which is made semi-cylindrical in form and with an inwardly-inclined bottom, A′, and is attached to a bar or plate, B. The bar B extends down a little below the bottom of the seed-box A, and to its projecting end is attached the wedge-shaped shoe C, the outer side of which is closed by a spring-plate, D, attached at its upper end to a bar of the said shoe C and inclining inward, so that its lower end will rest against the vertical inner side of the shoe C. The shoe C is made with an open top, to allow any soil that may enter the said shoe to be readily removed. The vertical inner part of the shoe C is made short, and has an outwardly-projecting plate, E, formed upon it to limit the depth to which the shoe enters the ground, and consequently the depth at which the seed is planted. In the shoe C, just above the stop E, is formed an outward bulge or flare, F, as shown in Figs. 1, 2, 4, and 5, to form an open-topped chamber, to allow the seed to be seen as it rests upon the spring D, ready to be deposited in the soil at the next descent of the slide.

G is a wooden bar, which is placed against the outer side of the bar B, is made narrower than the said bar B, and is kept in place by a keeper, H, attached to the upper part of the bar B.

To the upper end of the bar G is attached a handle, I, which is made with a wooden hand-piece, J, and has a rabbet, I′, in its lower part to receive the upper end of the bar G. In the shoulder of the rabbet of the handle I is formed a groove, I², into which the end of the bar G is fitted, and in the middle part of which is formed a projection, K, to enter a notch in the upper end of the bar G, to hold the handle I from lateral movement and adapt it to be secured in place by a single screw. The lower end of the handle I is so formed as to strike against the upper end of the bar B, and serve as a stop to limit the downward movement of the bar G. The upward movement of the slide-bar G is limited by the upper edge of the triangular stop-plate L, attached to the slide-bar G, striking against the keeper H.

M is a cast-iron plate, in the inner side of the upper end of which is formed a recess, N, to receive and fit upon the lower end of the slide-bar G, to which it is secured by screws. In the plate M, a little below the recess N, is formed a slot, O, the edges of which, at the outer side of the said plate, are rabbeted to receive the ends of the stock of the cut-off brush P. The cut-off brush P is secured in the slot of the plate M by a cap-plate, Q, upon the lower end of which is formed a lip to underlap the edge of the plate M at the lower end of the slot O. The upper end of the cap-plate Q is secured to the plate M by a screw, R, so that the brush P will be firmly held in place, and can be removed by taking out a single screw. In the inner side of the plate M, below the slot O, is formed a groove, S, into which is fitted the gage T. The gage T has a screw, U, attached to it, which passes through a short slot in the plate M, and has a hand-nut, V, screwed upon its outer end, so that the gage T can be adjusted to drop less or more seed for a hill by loosening the hand-nut V and moving the gage T up or down. The upper end of the gage T is concaved and inclined, as shown in Figs. 1 and 3, so that the corn will slide off readily. With this construction, when the slide-bar G is raised, the corn in the seed-box A passes through the slot W in the bar B, and enters and fills the space between the brush P and the gage T. As the slide-bar G descends the corn in the space between the gage T and brush P slides into the shoe C and rests upon the spring D, where it can be seen through the open upper end of the bulge or chamber F of the shoe C, as the slide-bar G is again raised. As the shoe C enters the soil and the slide-bar G is forced down it forces back the spring D and allows the seed to drop into the space thus formed in the soil. As the slide-bar G is drawn upward in raising the planter from the ground the brush P rubs against and stirs the corn in the slot W, so that it will pass freely into the space between the said brush P and the gage T, to be carried down by the next downward movement of the slide G. Upon the upper edge of the gage T is formed a flange, X, to rest against the inner side of the plate M and cover the upper end of the slot through the said plate, and thus prevent the seed from escaping through or lodging in the said slot.

Having thus described my invention, I claim as new and desire to secure by Letters Patent—

1. In a hand corn-planter, the slide-bar G, provided with a cut-off brush, P, arranged in the slot O of a plate, M, and under a cap-plate, Q, underlapping the plate M, as shown and described.

2. In a hand corn-planter, the combination of the gage T, the bar B, having slot W, the brush P, the shoe C, and the spring D, all arranged as described, with the slide-bar G, having plate M, for the purpose specified.

3. In a hand corn-planter, the combination, with the upper end of the slide-bar G, of the handle I, having rabbet I' and groove I² to receive the upper end of the said bar, and having a projection, K, to engage with the said end of the bar and adapt the handle to be secured by a single screw, substantially as herein shown and described.

SAMUEL MEEKER MACOMBER.

Witnesses:
   HERBERT WRIGHT LADD,
   WARREN SWIFT PEARL.